(12) United States Patent
Moorcroft

(10) Patent No.: US 11,739,710 B2
(45) Date of Patent: *Aug. 29, 2023

(54) CONTROLLER AND METHOD FOR CONTROLLING OPERATION OF A DIRECT INJECTION INTERNAL COMBUSTION ENGINE

(71) Applicant: JAGUAR LAND ROVER LIMITED, Warwickshire (GB)

(72) Inventor: Adam Moorcroft, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,816

(22) Filed: Jul. 21, 2022

(65) Prior Publication Data

US 2022/0356857 A1  Nov. 10, 2022

Related U.S. Application Data

(63) Continuation of application No. 17/429,019, filed as application No. PCT/EP2020/053004 on Feb. 6, 2020, now Pat. No. 11,415,073.

(30) Foreign Application Priority Data

Feb. 7, 2019  (GB) ...................... 1901673

(51) Int. Cl.
*F02D 41/40* (2006.01)
*F02D 13/02* (2006.01)
(Continued)

(52) U.S. Cl.
CPC ......... *F02D 41/40* (2013.01); *F02D 13/0223* (2013.01); *F02D 41/0087* (2013.01);
(Continued)

(58) Field of Classification Search
CPC .... F02D 41/40; F02D 41/0087; F02D 41/067; F02D 41/062; F02D 13/0223; F02D 2041/389; F02D 2200/101; F02P 5/1502
(Continued)

(56) References Cited

U.S. PATENT DOCUMENTS

| | | |
|---|---|---|
| 6,257,194 B1 | 7/2001 | Kerns et al. |
| 7,159,561 B1 | 1/2007 | Kerns et al. |

(Continued)

FOREIGN PATENT DOCUMENTS

| | | |
|---|---|---|
| CN | 101278113 A | 10/2008 |
| CN | 102483000 A | 5/2012 |

(Continued)

OTHER PUBLICATIONS

Combined Search and Examination Report under Sections 17 and 18(3) for Application No. GB1901673.2 dated Jul. 30, 2019.

(Continued)

*Primary Examiner* — Hai H Huynh
(74) *Attorney, Agent, or Firm* — Carlson, Gaskey & Olds, P.C.

(57) ABSTRACT

Aspects of the present invention relate to a controller (104) and method (400) for controlling operation of an internal combustion engine (101). The controller (104) is configured to: receive a first request signal indicative of a request to stop fuel being supplied to the engine (101), and cause an intake valve (301) of a cylinder (103) of the internal combustion engine (101) to remain closed during the current revolution of the internal combustion engine (101) and revolutions of the internal combustion engine (101) immediately following the current revolution of the internal combustion engine (101) in dependence on at least one of: the intake valve (301) being closed at the time of receiving the first request signal; or a next opening of the intake valve having not been (Continued)

scheduled. The controller (104) is also configured to cause injection of fuel into the cylinder (103) and subsequently cause the intake valve (301) to remain closed during revolutions of the internal combustion engine (101) immediately following a next closing of the intake valve (301), in dependence on at least one of: the intake valve (301) being open at the time of receiving the first request signal; and a next opening of the intake valve (301) having already been scheduled at the time of receiving the first request signal and said next opening of the intake valve (301) is to be performed.

16 Claims, 14 Drawing Sheets

(51) Int. Cl.
  *F02D 41/00* (2006.01)
  *F02D 41/06* (2006.01)
  *F02P 5/15* (2006.01)
  *F02D 41/38* (2006.01)
(52) U.S. Cl.
  CPC .......... *F02D 41/062* (2013.01); *F02P 5/1502* (2013.01); *F02D 2041/389* (2013.01); *F02D 2200/101* (2013.01)

(58) Field of Classification Search
  USPC ...... 123/179.3, 179.4, 90.15, 399, 436, 299, 123/300; 701/103–105, 110, 112, 113
  See application file for complete search history.

(56) References Cited

U.S. PATENT DOCUMENTS

| | | |
|---|---|---|
| 2006/0272608 A1 | 12/2006 | Hara et al. |
| 2007/0163531 A1 | 7/2007 | Lewis et al. |
| 2012/0245828 A1 | 9/2012 | Ezaki |

FOREIGN PATENT DOCUMENTS

| | | |
|---|---|---|
| CN | 103883413 A | 6/2014 |
| EP | 1998030 A1 | 12/2008 |
| EP | 2392810 B1 | 7/2018 |
| FR | 3072726 A3 | 4/2019 |
| JP | 2001090564 A | 4/2001 |

OTHER PUBLICATIONS

International Search Report and Written Opinion of the International Searching Authority for International application No. PCT/EP2020/053004 dated Jul. 1, 2020.
Notification of first review opinion, CN Application No. 202080013411.8 dated Nov. 21, 2022.

US 11,739,710 B2

CONTROLLER AND METHOD FOR CONTROLLING OPERATION OF A DIRECT INJECTION INTERNAL COMBUSTION ENGINE

CROSS REFERENCE TO RELATED APPLICATIONS

This application is a continuation of U.S. patent application Ser. No. 17/429,019, filed on Aug. 6, 2021, which is the national stage application of International Application No. PCT/EP2020/053004, filed on Feb. 6, 2020, which claims priority to GB Application No. 1901673.2, filed on Feb. 7, 2019.

TECHNICAL FIELD

The present disclosure relates to a controller and method for controlling operation of an internal combustion engine. In particular, but not exclusively it relates to a controller and method for controlling operation of an internal combustion engine in a road vehicle, such as a car.

BACKGROUND

Three-way catalytic convertors are known to be used to receive exhaust gases from an internal combustion engine and convert toxic gases and pollutants into less-toxic products. The catalytic converters combine oxygen with carbon monoxide and unburned hydrocarbons to produce carbon dioxide and water, and, in addition, reduce oxides of nitrogen. Such catalytic converters operate most efficiently within a particular temperature range and when the composition of gas passing through the catalytic converter is such that the ratio of constituent gases of the composition is within a particular range.

A problem with a three way catalytic converter is that its efficiency may be adversely affected by stopping the engine or reducing the combustion torque output of the engine (i.e. the torque output of the engine resulting from the combustion of air and fuel) to zero.

When a request to stop the engine is received by a controller, for example as a result of a driver's request or an 'eco stop' function requesting shut down of the engine, the controller outputs a signal to stop fuel injection (otherwise known as a fuel cut signal). Due to the inertia of the engine, the engine will continue to rotate after fuel supply to the engine has been stopped or cut, but typically the intake and exhaust valves will continue to open and close. As a result, air is exhausted from the engine in place of combustion products. Similarly, when the engine is restarted, air which was trapped in one or more cylinders that were stopped in the compression or exhaust stroke is exhausted before the next intake stroke of those cylinders.

This causes a problem with the catalyst becoming over oxygenated such that it cannot efficiently convert pollutants exhausted by the engine. In addition, it may contribute to the temperature of the catalyst being reduced to below its light-off temperature (the temperature below which it cannot effectively convert pollutants). The following engine start and drive-away can cause excessive NOx (nitrogen monoxide and nitrogen dioxide) production and catalyst breakthrough (i.e. pollutants passing through the catalyst without being converted). This problem is particularly prevalent in vehicles in which the engine is frequently stopped and restarted, for example vehicles equipped with stop-on-the-move capabilities and PHEVs (plug-in hybrid electric vehicles) capable of operating for extended periods of time in electric only drive.

To counteract this problem there are known control functions invoked to inject additional fuel for a period of time, or a number of intake valve events, following reinstatement of fueling (either at engine restart or following receipt of a positive torque request during overrun) until one or more models or exhaust sensor measurements indicate that the catalyst has become re-neutralised and is above its light-off temperature. Although fuel is saved during the fuel cut phase, the fuel enriched neutralisation process counteracts some of the fuel saving and produces more emissions than maintaining air-fuel ratio control throughout.

It is an aim of the present invention to address one or more of the disadvantages associated with the prior art.

SUMMARY OF THE INVENTION

Aspects and embodiments of the invention provide a controller, a control system, an internal combustion engine, a vehicle, a method and a non-transitory computer readable medium as claimed in the appended claims.

According to an aspect of the invention there is provided a controller for controlling operation of a direct injection internal combustion engine, the controller being configured to: receive a first request signal indicative of a request to stop fuel being supplied to the engine; cause an intake valve of a cylinder of the internal combustion engine to remain closed during the current revolution of the internal combustion engine and revolutions of the internal combustion engine immediately following the current revolution of the internal combustion engine in dependence on the intake valve being closed at the time of receiving the first request signal; and cause injection of fuel into the cylinder and subsequently cause the intake valve to remain closed during revolutions of the internal combustion engine immediately following a next closing of the intake valve, in dependence on at least one of: the intake valve being open at the time of receiving the first request signal; and a next opening of the intake valve having already been scheduled at the time of receiving the first request signal and said next opening of the intake valve is to be performed.

This provides the advantage that the fuel injection to the cylinder is stopped as soon as possible after the request signal is received, but prevents unreacted oxygen from being exhausted from the engine and thereby is able to prevent oxidation of a catalytic converter receiving the gases exhausted from the cylinder. Consequently the efficiency of the catalytic converter during restarting of the engine is improved and the proportion of toxic pollutants passing through the catalytic converter without being converted is reduced.

The first request signal indicative of a request to stop fuel being supplied to the engine may be indicative of a request to reduce a torque output of the internal combustion engine to zero. For example, the controller may be used within a hybrid vehicle that is arranged to cut fuel supply to the internal combustion engine when the vehicle is stopped, being slowed down, or when an electric motor of the vehicle is usable for driving the vehicle. In a further example, the request to reduce a torque output of the internal combustion engine to zero may be received following a driver of a vehicle releasing an accelerator pedal of the vehicle when the vehicle is in motion, such that the internal combustion engine enters an overrun state. In yet a further example, the first request signal may be indicative of a user request to switch off the internal combustion engine.

The intake valve of the cylinder may be caused to be closed and/or kept closed by providing an output signal to a valve actuation means, such as a solenoid arranged to deactivate a hydraulic system that would otherwise cause opening of the valve on an intake stroke of the engine. Alternatively, the intake valve of the cylinder may be arranged to be closed by default and opened by the valve actuation means in response to a received signal. For example, the actuation means may comprise a solenoid arranged to open the intake valve in dependence on receiving a signal and the controller may therefore cause the intake valve to remain closed by not providing a signal to the solenoid valve.

Optionally, said controller comprises
an electronic processor having an electrical input for receiving said first request signal; and
an electronic memory device electrically coupled to the electronic processor and having instructions stored therein,
the processor being configured to access the memory device and execute the instructions stored therein such that it is operable to:
cause the intake valve to remain closed during the current revolution of the internal combustion engine and revolutions immediately following the current revolution of the internal combustion engine, in dependence on the intake valve being closed at the time of receiving the first request signal; and
cause the injection of fuel into the cylinder and subsequently cause the intake valve to remain closed for revolutions of the internal combustion engine immediately following the next closing of the intake valve, in dependence on at least one of:
the intake valve being open at the time of receiving the first request signal;
and a next opening of the intake valve has already been scheduled at the time of receiving the first request signal and said next opening of the intake valve is to be performed.

Optionally, the controller is configured to cause the intake valve to remain closed for the current revolution of the internal combustion engine and revolutions immediately following the current revolution of the internal combustion engine in dependence on a next opening of the intake valve having not been scheduled.

Optionally, the controller is configured to cause ignition of fuel in the cylinder following said next closing of the intake valve, to enable combustion of the fuel in the cylinder during a next power stroke following the next closing of the intake valve.

Optionally, the controller is configured to cause said ignition only after a piston in the cylinder has reached top dead center. This provides the advantage that less of the energy generated by the combustion is used to turn the engine and therefore the engine is able to stop more quickly. In addition, a larger proportion of combustible gases may be exhausted to a catalytic converter, so that more combustion takes place within the catalytic converter, and consequently its temperature is given a boost before fuel supplied to the engine is stopped. This enables the temperature of the catalytic converter to remain above its operating temperature for a longer period after the engine is stopped, and there is a higher probability of it being above its operating temperature when the engine is restarted.

Optionally, the controller is configured to: receive a second request signal indicative of a request to increase a combustion torque output of the internal combustion engine from zero; cause opening of the intake valve of each cylinder of the internal combustion engine; cause injection of fuel into each said cylinder; and cause combustion of fuel during each power stroke of each said cylinder that next follows each intake stroke of that cylinder in which the intake valve was open. Causing such combustion provides the advantage that only air that has been used in a combustion process is exhausted, and this limits the amount of oxygen that may exhausted to a catalytic converter in an exhaust system of the engine. Consequently unwanted oxidation of the catalytic converter during start-up of the engine is prevented. This may allow a stoichiometric mixture of fuel and air, rather than a fuel rich mixture, to be used immediately after start-up of the engine. This may therefore reduce emission of air pollutants from the exhaust system.

Optionally, the controller is configured to: receive a start request signal indicative of a request to increase a rotational speed of an output of the internal combustion engine from zero; and maintain in a closed position an intake valve of at least one cylinder of the internal combustion engine during at least a first intake stroke of the at least one cylinder. This provides the advantage that the start-up of the engine may be made more smoothly and therefore noise, vibration and harshness may be reduced.

Optionally, the controller is configured to cause a secondary torque source to rotate the internal combustion engine while the intake valve of the at least one cylinder is maintained in the closed position.

Optionally, the controller is configured to prevent opening of any intake valve of the internal combustion engine until: an intake stroke of a cylinder of the internal combustion engine that is expected to have its next power stroke after the internal combustion engine has reached a required speed of rotation; or the internal combustion engine (101) has been rotated through a predefined angle. This provides the advantage that the start-up of the engine may be made more smoothly and therefore noise, vibration and harshness may be reduced.

Optionally, the controller is configured to cause a first opening of the intake valve of the at least one cylinder following receipt of the second request signal or the start request signal, and cause injection of fuel into the at least one cylinder for combustion during a first combustion stroke following the first opening. This provides the advantage that the proportion of toxic pollutants passing through the catalyst without being converted may be further reduced.

Optionally, the injection of fuel into the at least one cylinder for combustion during the first combustion stroke following the first opening produces a stoichiometric mixture of air and fuel.

According to another aspect of the invention there is provided a control system for controlling operation of an internal combustion engine comprising a controller according to any one of the previous paragraphs and a valve actuation means configured to cause opening of the intake valve of each cylinder of the internal combustion engine in dependence on a received signal and allow the intake valve of each said cylinder to remain closed during an intake stroke of each said cylinder.

Optionally, the valve actuation means comprises a variable valve lift system. This provides the advantage of a valve lift system that may be controlled to maintain the intake valves in a closed position during an intake stroke.

Optionally, the variable valve lift system comprises a continuous variable valve lift system.

Optionally, the variable valve lift system comprises a hydraulic system.

According to a further aspect of the invention there is provided an internal combustion engine comprising the controller of any one of the previous paragraphs or the control system of any one of the previous paragraphs, wherein the engine comprises exhaust valves mechanically actuated by cams fixed to a camshaft.

Optionally, the internal combustion engine is arranged to inject fuel directly into the cylinders.

According to yet another aspect of the invention there is provided a vehicle comprising the controller, the control system or the internal combustion engine according to any one of the previous paragraphs.

According to a yet further aspect of the invention there is provided a method of controlling an internal combustion engine comprising: receiving a first request signal indicative of a request to stop fuel being supplied to the engine; in dependence on an intake valve of a cylinder being closed at the time of receiving the first request, causing the intake valve to remain closed during the current revolution of the internal combustion engine and revolutions immediately following the current revolution of the internal combustion engine; and in dependence on the intake valve of the cylinder being open or in dependence on a next opening of the intake valve having already been scheduled and said next opening of the intake valve is to be performed, causing injection of fuel into the cylinder and subsequently causing the intake valve to remain closed for revolutions immediately following the next closing of the intake valve.

This provides the advantage that the fuel injection to the cylinder is stopped as soon as possible after the request signal is received, but prevents unreacted oxygen from being exhausted from the engine and thereby is able to prevent oxidation of a catalytic converter receiving the gases exhausted from the cylinder. Consequently the efficiency of the catalytic converter during restarting of the engine is improved and the proportion of toxic pollutants passing through the catalytic converter without being converted is reduced.

Optionally, the method comprises causing ignition of said fuel in the cylinder only after a piston in the cylinder has reached top dead center. This provides the advantage that a larger proportion of the gases exhausted to a catalytic converter contain combustible gases, and therefore combustion of those gases in the catalytic converter enables it to remain at a high temperature for longer.

Optionally, the method comprises: receiving a second request signal indicative of a request to increase torque output of the internal combustion engine from zero; causing opening of the intake valve of each cylinder of the internal combustion engine; causing injection of fuel into each said cylinder; and causing combustion of fuel during each power stroke that next follows an intake stroke in which the intake valve was open.

Optionally, the method comprises: receiving a start request signal indicative of a request to increase rotational speed of an output of the internal combustion engine from zero; and maintaining in a closed position an intake valve of at least one cylinder of the internal combustion engine during at least a first intake stroke of the at least one cylinder.

Optionally, the method comprises: causing a first opening of the intake valve following receipt of the second request signal or the start request signal; and causing injection of fuel into the cylinder for combustion during a first combustion stroke following the first opening.

Optionally, said causing injection of fuel into the cylinder comprises causing injection of fuel into the cylinder to produce a stoichiometric mixture of air and fuel.

According to a yet further aspect of the invention there is provided a non-transitory computer readable medium comprising computer readable instructions that, when executed by a processor, cause performance of a method according to any one of the previous paragraphs.

According to a yet another aspect of the invention there is provided a controller for controlling operation of an internal combustion engine comprising a plurality of cylinders, the controller being configured to: receive a request signal indicative of a request to increase the speed of the internal combustion engine from zero; in dependence on receiving the request signal, provide an output signal to cause the internal combustion engine to be rotated; and maintain in a closed position an intake valve of at least one cylinder of the internal combustion engine during at least a first intake stroke of the at least one cylinder.

Optionally, the controller is configured to cause combustion of fuel during each power stroke that immediately follows an intake stroke in which the intake valve is open.

According to a yet further aspect of the invention there is provided a controller for controlling operation of a direct injection internal combustion engine, the controller being configured to control an intake valve of a cylinder of the internal combustion engine and injection of fuel into the cylinder in dependence on a position of the valve at the time of receiving a signal indicative of a request to change an operating state of the internal combustion engine.

Optionally, the signal is indicative of a request to stop fuel being supplied to the engine.

Within the scope of this application it is expressly intended that the various aspects, embodiments, examples and alternatives set out in the preceding paragraphs, and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
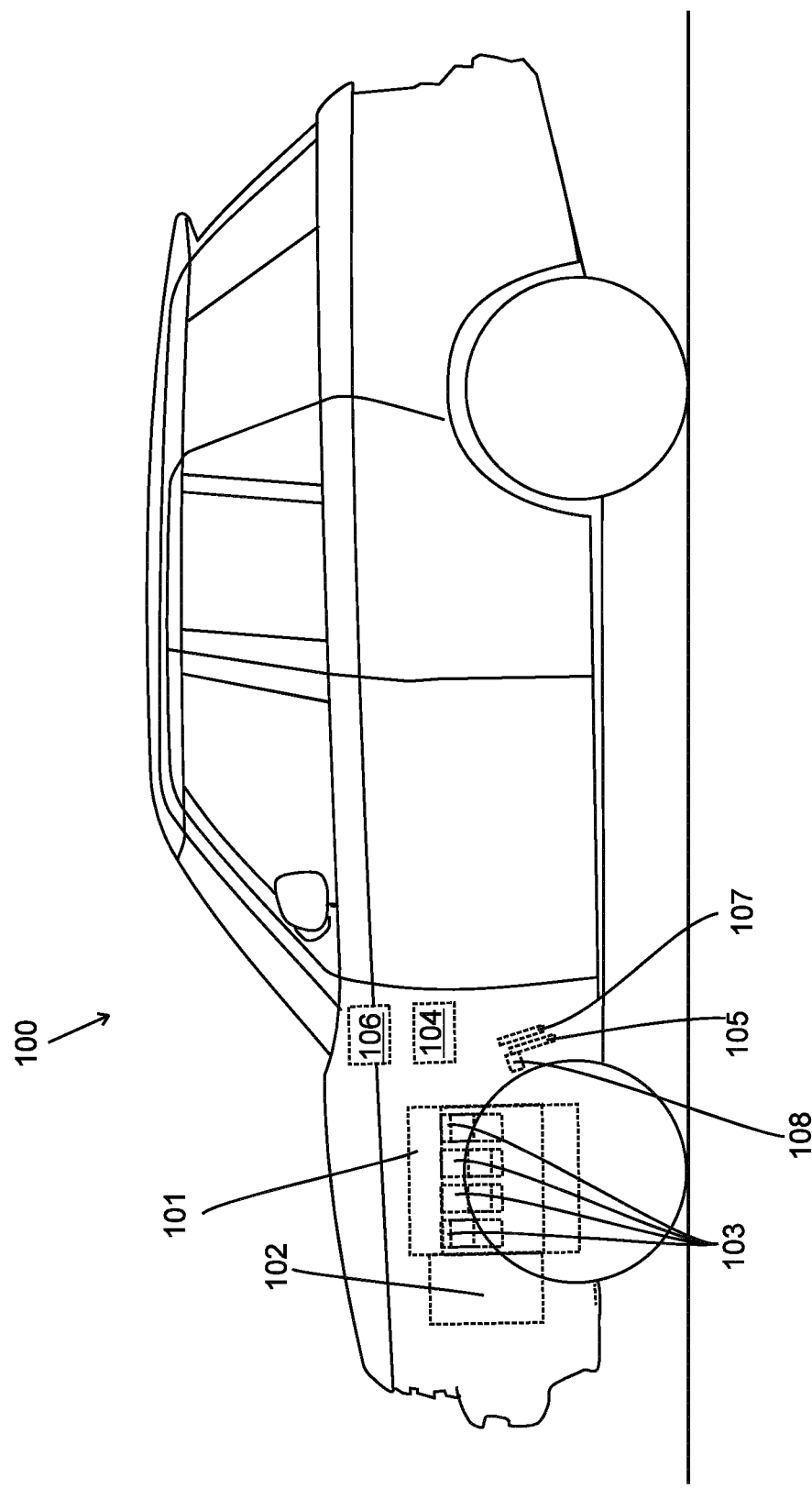
FIG. 1 shows a vehicle embodying the present invention.

A vehicle 100, a control system 201, a controller 104, a method 400 and a non-transitory computer readable medium 210 in accordance with an embodiment of the present invention is described herein with reference to the accompanying Figures.

With reference to FIG. 1, the vehicle 100 is a road vehicle in the form of a car. The vehicle 100 comprises an internal combustion engine 101 (referred to below as the engine 101) and a secondary torque source 102 for turning the engine 101 over to start it. The secondary torque source 102, in the present embodiment, is in the form of a belt integrated starter generator 102 configured to rapidly increase the rotational speed of the output of the engine 101 from zero when it is to be restarted.

In the present embodiment the engine 101 is a four-stroke petrol (i.e. gasoline) engine comprising four cylinders 103, but it will be appreciated that other embodiments may comprise less than or more than four cylinders.

The vehicle 100 comprises an accelerator pedal 105, including an accelerator pedal sensor 108, and a brake pedal 107 to enable a user to control the speed of the vehicle 100.

The vehicle 100 also comprises a controller 104 in the form of an engine control unit (ECU) configured to control operation of the engine 101. Amongst other things, the controller 104 is arranged to control fuel injection into the cylinders 103 of the engine 101 in response to signals received from various components of the vehicle 100 including the accelerator pedal sensor 108 and a vehicle starting system 106 that is configured to receive user inputs indicative of user requests to switch on the vehicle 100 or switch off the vehicle 100. The starting system 106 may comprise a user operable switch and a smart key detection means, or an ignition key switch, or other means of enabling a user to provide indications that the engine 101 is to be started or stopped.

Figure 2:
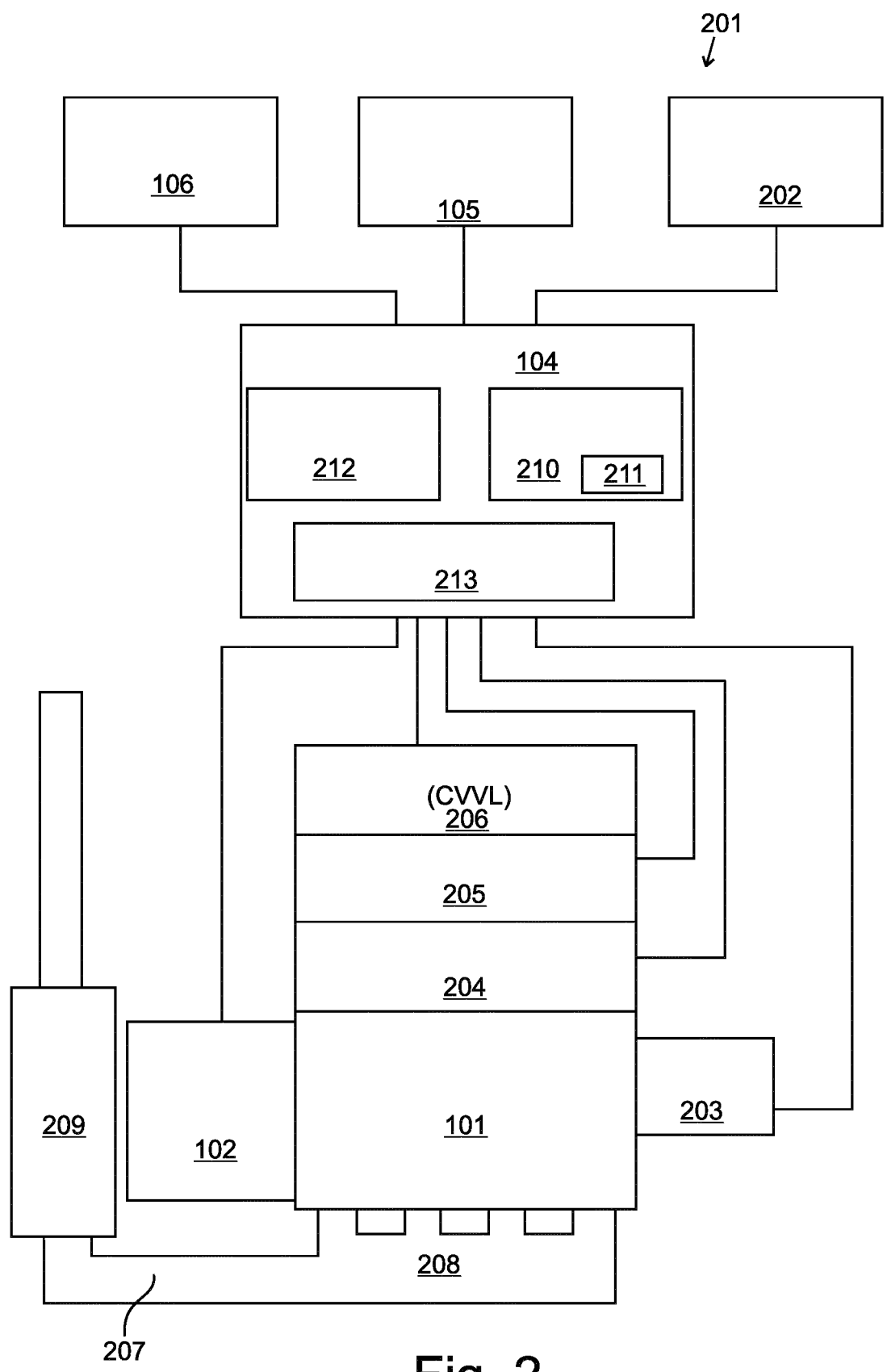
FIG. 2 shows a control system comprising a controller arranged to control operation of an engine of the vehicle.

The controller 104 forms a part of a control system 201, shown schematically in FIG. 2, which is arranged to control operation of the engine 101. As well as receiving input signals from the starting system 106 and the accelerator pedal sensor 108, the controller 104 is also arranged to receive input signals from a brake system 202 of the vehicle 100 indicative of user request that are input at the brake pedal 107 (shown in FIG. 1). It also receives input signals from a sensing device 203 arranged to sense the position of the crankshaft (not shown) of the engine 101. In the present embodiment the sensing device 203 comprises a pair of Hall Effect sensors that are positioned to detect the orientation of the flywheel (not shown) of the engine 101.

In response to received input signals, the controller 104 is configured to provide output signals to various components of the control system 201 that control operation of the engine 101, including: fuel injectors 204 for controlling the mass of fuel injected into the cylinders 103 of the engine 101; an ignition system 205 for igniting a fuel and air mixture within the cylinders 103; and a valve actuation means 206 for actuating intake valves (301 shown in FIG. 3) of the cylinders 103 of the engine 101. In the present embodiment the valve actuation means 206 is a continuous variable valve lift (CVVL) system 206, but in alternative embodiments the valve actuation means 206 may comprise a discrete variable valve lift system. However, in either case, in dependence on signals received from the controller 104, the valve actuation means 206 is capable of opening intake valves of the cylinders 103 during respective intake strokes but also capable of continuously maintaining the intake valves of the cylinders 103 in a closed position while the engine 101 is rotated through two or more revolutions.

During its operation, exhaust gases are emitted from the engine 101 via an exhaust system 207 comprising an exhaust manifold 208 and a three-way catalytic converter 209.

During normal operation of the engine 101, when it is producing combustion torque, the controller 104 is configured to provide output signals to the fuel injectors 204, the ignition system 205 and the valve actuation means 206 to cause intake of air into the cylinders 103, injection of fuel into the cylinders 103 and ignition of the fuel at specific times within the four-stroke combustion cycle of the cylinders 103. The engine 101 is a direct injection internal combustion engine 101 and therefore, typically, for each cylinder 103, the intake valve (or the intake valves, in embodiments where there are several) are opened and closed during an intake stroke, and fuel is injected into the cylinder 103 during the intake stroke so that the injected fuel is mixed with air drawn in past the open intake valves. The ignition system 205 then ignites the fuel and air mixture towards the end of a compression stroke so that the mixture burns during the following power stroke. The combustion products are then exhausted from the engine 101 in the following exhaust stroke before the cycle begins again with a further intake stroke. The timing of the fuel injection, ignition and intake valve opening and closing are scheduled by the controller 104 in dependence on timing signals received from the sensing device 203.

If the engine 101 is not running and a signal is received indicating that the engine 101 is required to produce combustion torque, the controller 104 may provide an output signal to the secondary torque means 102 to cause it to turn the engine 101 over and provide signals to the valve actuation means 206, the fuel injectors 204 and ignition system 205 to cause the engine to be started.

If the engine 101 is running, and a fuel cut signal is received indicating that fuel provided to the engine 101 is to be stopped, the controller 104 co-ordinates stopping of fuel supply to the engine 101 and stopping of ignition of the air-fuel mixture so that the engine 101 stops producing combustion torque. In addition, as will be described in further detail below, the controller 104 also co-ordinates closing of the intake valves of the engine 101 to prevent oxygen reaching the three-way catalytic converter and causing oxidation of the catalyst.

In the present embodiment, the controller 104 is configured to stop and start the engine 101 in accordance with requirements for torque to be produced by the engine. Thus, a fuel cut signal received at the controller 104 could be received from the starting system 106 which has received a user input indicating that the engine 101 is to be switched off, but alternatively, the fuel cut signal may be received from the accelerator pedal sensor 108 indicating that the user has released the accelerator pedal 105 and no torque is required to be produced by the engine 101, or alternatively the fuel cut signal may be received by the controller 104 from the brake system 202, which has received a user input at the brake pedal 107 requesting that the vehicle 100 is to slow down or to stop accelerating when travelling down a hill.

Similarly, when the engine 101 is not producing torque, the controller 104 is configured to cause reinstatement of fuel supply to the engine 101 in dependence on receiving a request signal indicating that positive engine torque is required. For example, the request signal may be generated by the accelerator pedal sensor 108, following a period in which the engine 101 has not been running at all, or at a time when the engine is still turning over due to momentum after it has previously been run.

In the present embodiment, the controller 104 comprises a memory device 210, which stores instructions 211, and a processor 212 configured to access the memory device 210 and execute the stored instructions 211 so that the processor 212 is operable to control the secondary torque source 102, the valve actuation means 206, the ignition system 205 and the fuel injectors 204. The controller 104 also comprises an input/output means 213 of the controller 104 to receive input signals from, and provide output signals to, other components of the vehicle 100. The input/output means 213 may include a transceiver for providing data communication over a data bus, such as a CAN (controller area network) bus.

Figure 3:
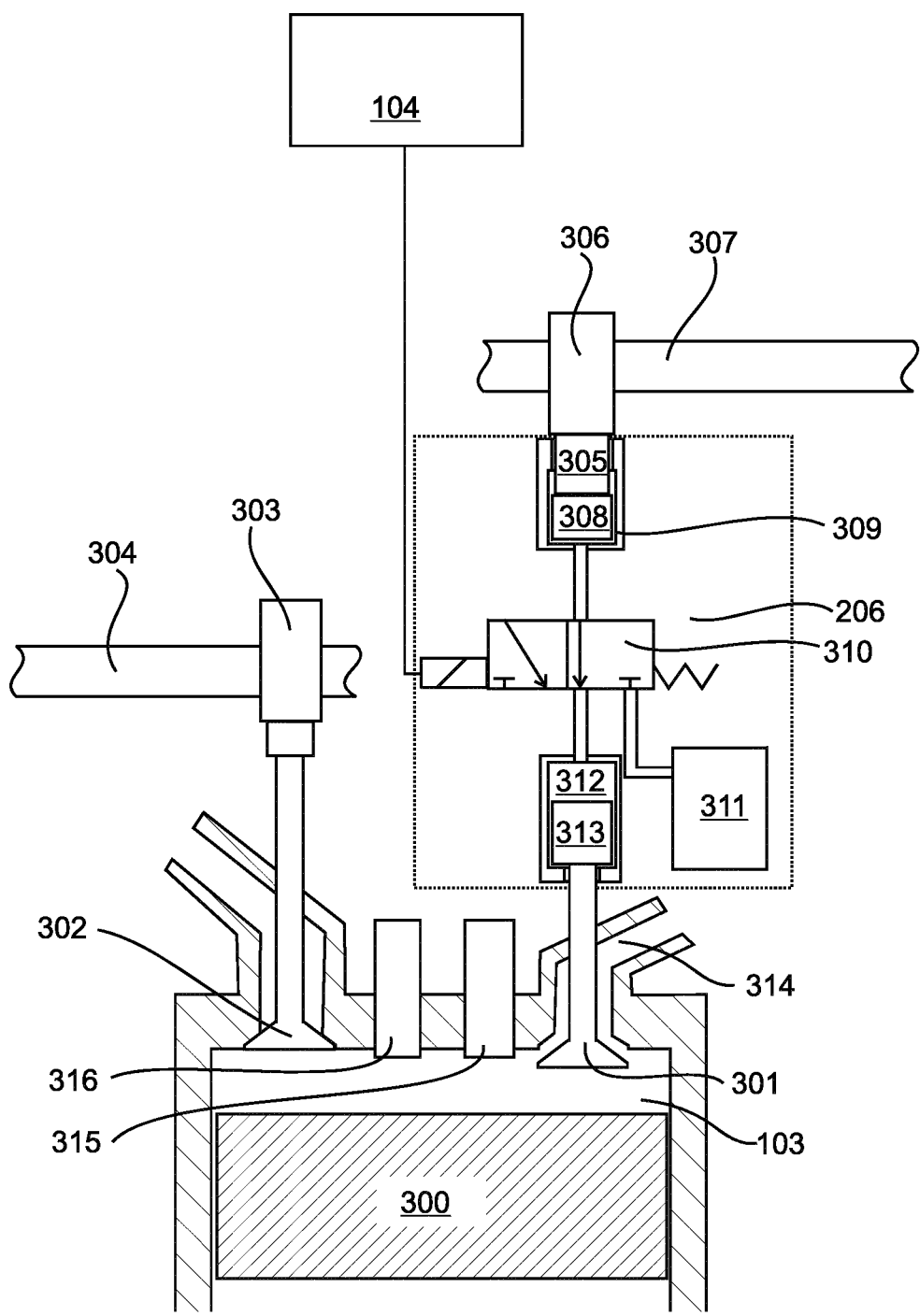
FIG. 3 shows details of a valve actuation means of the control system.

Further details of the valve actuation means 206 of the system 201 is illustrated in FIG. 3, which shows one of the cylinders 103 of the engine 101 containing a piston 300. FIG. 3 also shows the mechanisms by which an intake valve 301 and an exhaust valve 302 of the cylinder 103 are actuated. It should be understood that although only one cylinder 103 with one intake valve 301 is illustrated in FIG. 3, the intake valves 301 of the other cylinders 103 may be actuated in a similar manner. Also, in other embodiments, each cylinder 103 may have more than one intake valve 301 and where the present specification refers to the operation of the intake valve of a cylinder, it also applies to the operation of all of the intake valves of a cylinder that has multiple intake valves. i.e. A reference to an intake valve 301 of a cylinder 103 being open, opening, being closed or closing, should be understood to be a reference to all of the intake valves 301 of a cylinder 103 being open, opening, being closed or closing in respect of an embodiment with multiple intake valves 301 for each cylinder 103.

In the present embodiment, the valve actuation means 206 comprises a hydraulic system of a known type which is arranged to actuate only the intake valves 301 of the engine 101. The exhaust valves 302 are actuated by direct mechanical interaction with a cam 303 on a camshaft 304, but in an alternative embodiment, the exhaust valves 302 may also be actuated by a continuous variable valve lift (CVVL) system in a similar manner to the intake valves 301.

The valve actuation means 206 comprises a cam follower 305 which is arranged to be actuated by a cam 306 located on a camshaft 307 of the engine 101. When actuated, the cam follower 305 actuates a piston 308 in a master cylinder 309 of the hydraulic system. The master cylinder 309 is hydraulically connectable via a solenoid valve 310 to a reservoir means 311 and a slave cylinder 312, which contains a piston 313. In the present embodiment, the solenoid valve 310 is biased so that connection is normally provided between the master cylinder 309 and the slave cylinder 312, while the reservoir means 311 is isolated from the master cylinder 309, and when the solenoid valve 310 is actuated, in response to a signal from the controller 104, the master cylinder 309 is connected to the reservoir means 311 and isolated from the slave cylinder 312.

The piston 313 of the slave cylinder 312 is arranged to actuate the intake valve 301. When the intake valve 301 is actuated, as illustrated in FIG. 3, the intake valve 301 is displaced from an intake port 314 of the cylinder 103 to allow air to be drawn into the cylinder 103.

During normal operation of the engine 101, the solenoid valve 310 provides connection between the master cylinder 309 and the slave cylinder 312, at least for a part of the period in which the cam 306 actuates the piston 308 of the master cylinder 309, during the intake stroke of the piston 300. Consequently, the piston 313 of the slave cylinder 312 is hydraulically actuated and pushes the intake valve 301 to an open position, as shown in FIG. 3. As the cam 306 is further rotated, it releases its pressure applied to the piston 308, allowing hydraulic fluid to return to the master cylinder 309, and the intake valve 301 to return to a closed position in which it closes the intake port 314.

However, in response to a signal from the controller 104, the solenoid valve 310 may be moved to connect the master cylinder 309 to the reservoir means 311 during the whole of the intake stroke of the piston 300, so that actuation of the piston 308 in the master cylinder 309 cannot cause actuation of the piston 313 in the slave cylinder 312. Consequently, the intake valve 301 remains in the closed position, so that no air is able to enter the cylinder 103 through the intake port 314 during the whole of the intake stroke.

As illustrated in FIG. 3, a fuel injector 315 is positioned to provide an injection of fuel directly into the cylinder 103, and an ignition device 316, such as a spark plug, is provided to ignite fuel and air mixtures present within the cylinder 103.

In alternative embodiments, the valve actuation means 206 may comprise another type of variable valve lift system, such as an electrical system comprising solenoids or electric motors that are arranged to actuate the intake valves 301 of the engine 101 directly.

Figure 4:
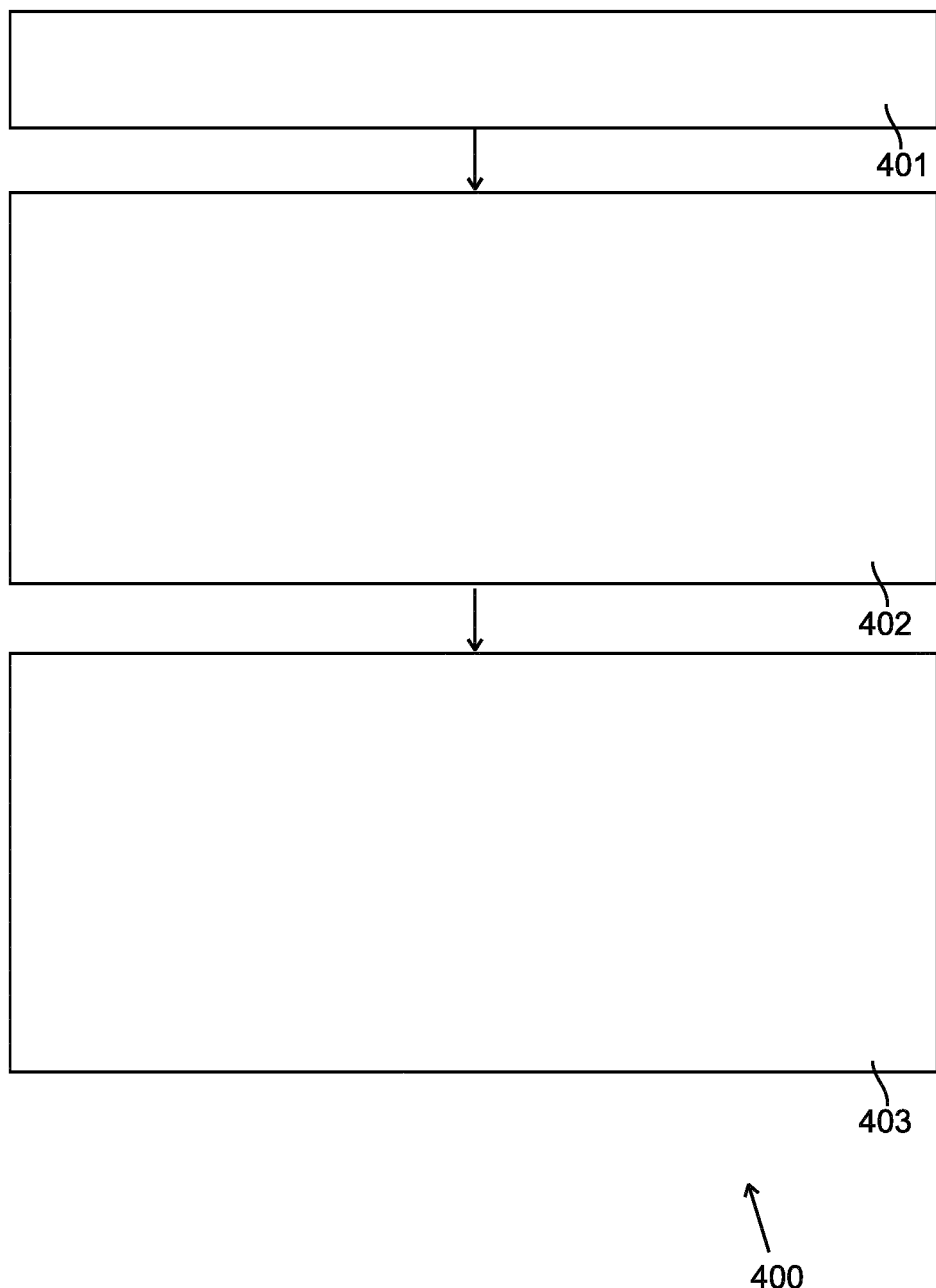
FIG. 4 shows a flowchart illustrating a method of controlling an internal combustion engine, which embodies the present invention.

A flowchart illustrating a method 400 of controlling an internal combustion engine 101 performable by the controller 104 is shown in FIG. 4. At block 401 a first request signal is received that is indicative of a request to cut fuel to the internal combustion engine 101. For example, the request signal may be received by the controller 104 from the starting system 106, which has generated the signal in response to receiving a user input indicating that the engine should be stopped, or the signal may be received from the brake system 202 indicating that the user of the vehicle 100 has applied pressure to the brake pedal 107 indicating that positive engine torque is not currently required.

At block 402 of the method 400, an intake valve 301 of a cylinder 103 of the internal combustion engine 101 is caused to remain closed for the current revolution of the internal combustion engine and revolutions of the internal combustion engine immediately following the current revolution of the internal combustion engine in dependence on the intake valve being closed at the time of receiving the first request signal. In the embodiment of FIG. 3, unless it is activated, the solenoid valve 310 is configured to provide hydraulic connection between the master cylinder 309 and the slave cylinder 312. Consequently, the process of block 402 may be achieved by providing a signal to the solenoid valve 310 to cause it to isolate the slave cylinder 312 from the master cylinder 309 and provide a hydraulic connection between the master cylinder 309 and the reservoir means 311.

In an alternative embodiment, in which the solenoid valve 310 is configured to provide connection between the master cylinder 309 and the reservoir means 311 unless the solenoid valve 310 is activated, the process of block 402 may be achieved by the controller 104 not providing a signal to the solenoid valve 310 that would cause it to connect the master cylinder 309 to the slave cylinder 312 during the intake stroke of the piston 300.

Figure 5:
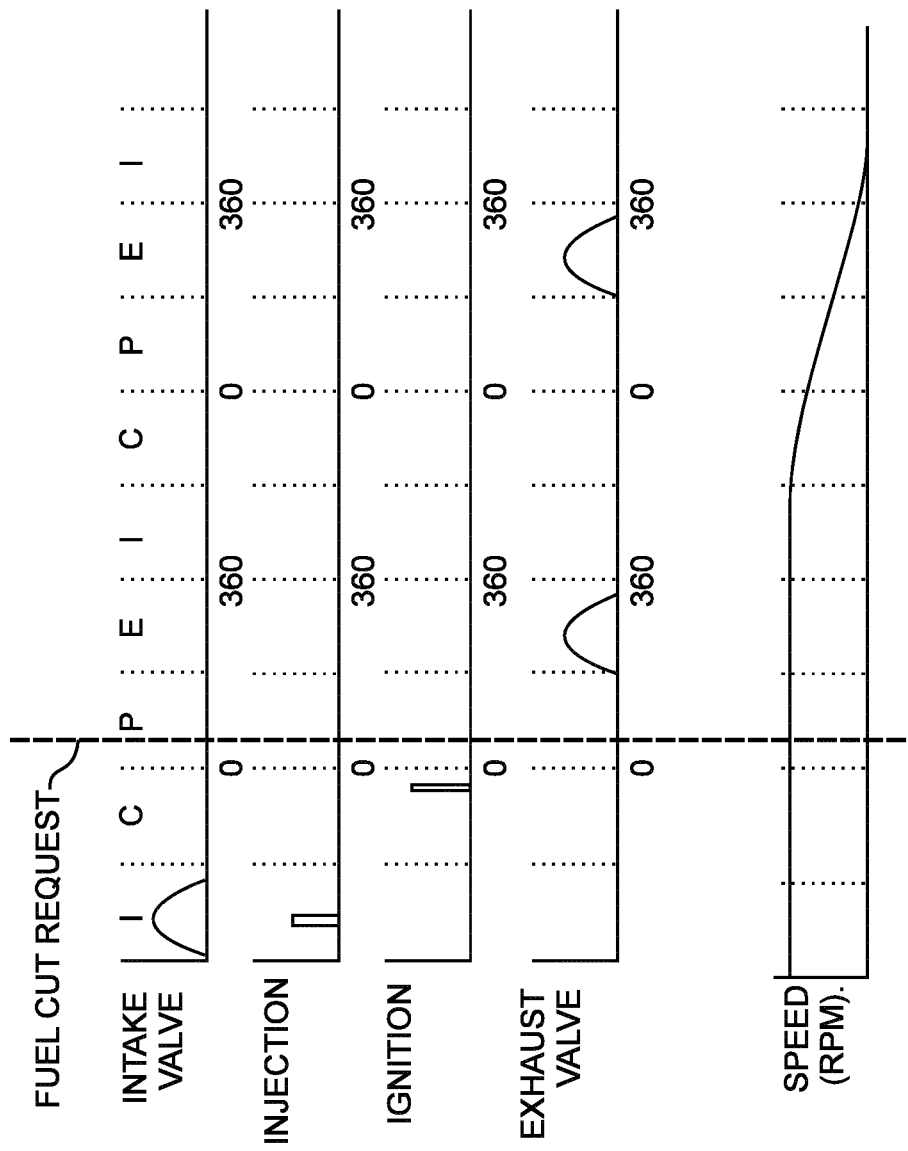
FIG. 5 shows graphs of intake valve position, fuel injection, ignition, exhaust valve position and engine speed during revolutions of the engine just before and after a fuel cut signal is received by the controller that illustrate a process of the method of FIG. 4.

An example of the process at block 402 is illustrated by the graphs of FIG. 5, which show intake valve position, fuel injection, ignition, exhaust valve position and engine speed during revolutions of the engine 101 just before and after a fuel cut signal is received by the controller 104. The four strokes are illustrated by the letters "I" for intake stroke, "C" for compression stroke, "P" for power stroke and "E" for exhaust stroke.

In this example, the fuel cut request is received while the intake valve 301 is in a closed position, and before the next opening of the intake valve has been scheduled by the controller 104. Consequently, for all revolutions of the engine 101 following the fuel cut request, the intake valve is kept closed and no fuel injections are performed. The exhaust valve 302 continues to open during exhaust strokes but since no air is received into the cylinder 103 during the intake strokes, no oxygen is exhausted to the catalytic converter 209.

At block 403 of the method 400, illustrated in FIG. 4, fuel is caused to be injected into the cylinder 103 and subsequently the intake valve 301 is caused to remain closed during revolutions of the internal combustion engine 101 immediately following a next closing of the intake valve 301, in dependence on at least one of: the intake valve 301 being open at the time of receiving the first request signal; and a next opening of the intake valve 301 having already been scheduled at the time of receiving the first request signal and said next opening of the intake valve is to be performed.

Figure 6:
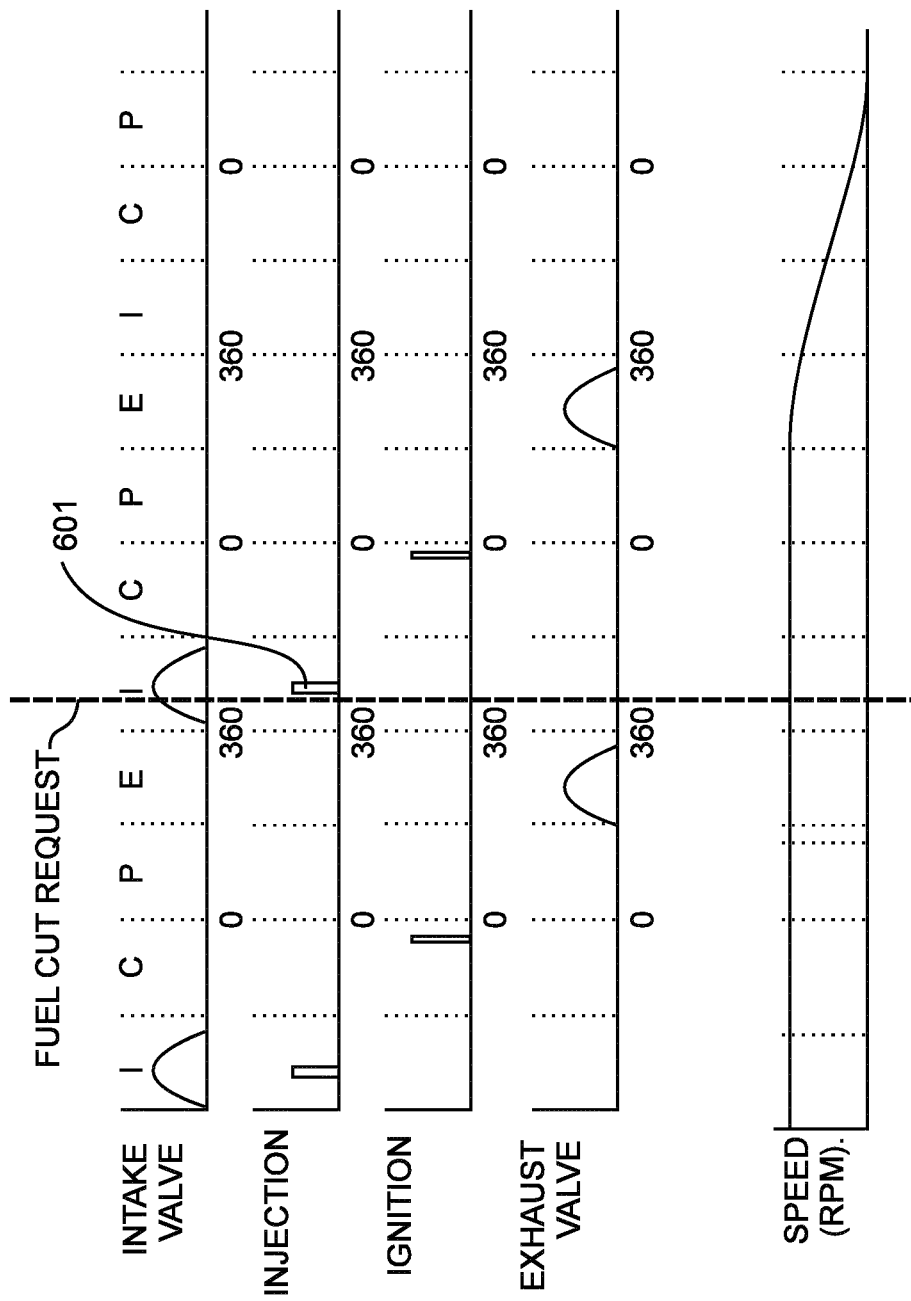
FIG. 6 shows graphs of intake valve position, fuel injection, ignition, exhaust valve position and engine speed during revolutions of the engine just before and after a fuel cut signal is received by the controller that illustrate another process of the method of FIG. 4.

An example of the process at block 403 is illustrated by the graphs of FIG. 6, which show intake valve position, fuel injection, ignition, exhaust valve position and engine speed during revolutions of the engine 101 just before and after a fuel cut signal is received by the controller 104. In this example, the fuel cut request is received after the intake valve 301 has started to be opened, letting air (containing oxygen) into the cylinder, but before fuel is injected into the cylinder. However, because the intake valve 301 is open when the fuel cut request is received, a final fuel injection 601 is allowed to be performed, following the fuel cut request. In the present embodiment, the final fuel injection 601 is performed during the intake stroke as it would be during normal operation of the engine 101. The intake valve 301 is then closed and kept closed for subsequent revolutions of the engine 101 until the engine comes to rest.

In the compression stroke immediately following the final fuel injection 601, the injected fuel is ignited and combustion takes place primarily in the following power stroke. Consequently exhaust gases resulting from the combustion are exhausted to the catalytic converter 209 in the following exhaust stroke. Thus, because the final fuel injection 601 is allowed to take place, oxygen is prevented from reaching the catalytic converter 209 and causing oxidation of the catalyst. The final fuel injection 601 also prevents the relatively rapid cooling of the catalytic converter 209 that would otherwise take place if air received by the cylinder 103 during the intake stroke were simply pumped into the catalytic converter 209 at the exhaust stroke without the final fuel injection 601 taking place.

Figure 7:
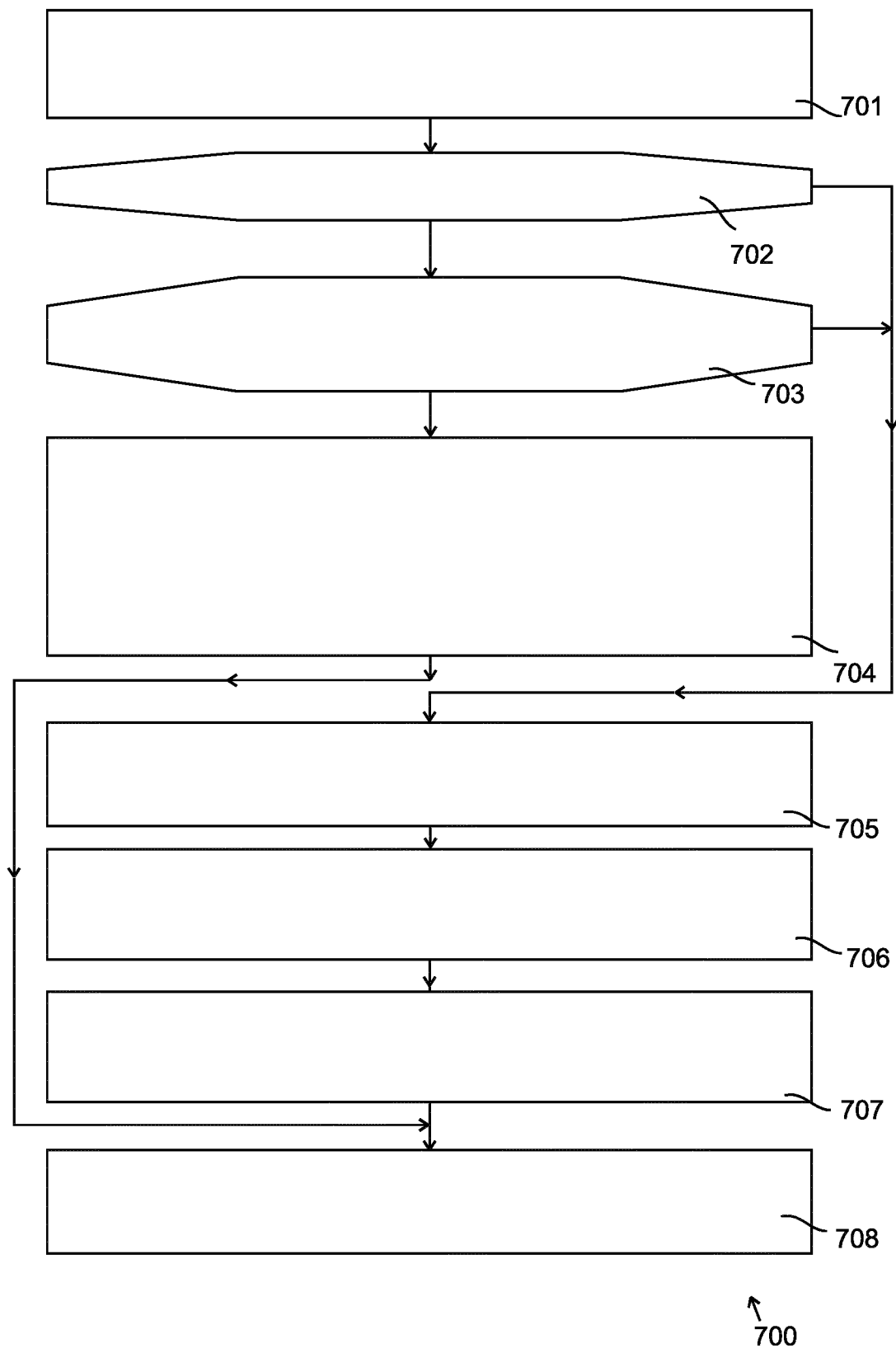
FIG. 7 shows a flowchart illustrating another method of controlling an internal combustion engine, which embodies the present invention.

A flowchart illustrating a method 700 of controlling an internal combustion engine 101 is shown in FIG. 7, which provides an example of the method 400 of FIG. 4.

At block 701 of the method 700, a first request signal indicative of a request to cut fuel to the engine 101 is received. The process at block 701 is therefore the same as the process at block 401 of FIG. 4.

At block 702 it is determined whether the intake valve 301 is closed. If it is not closed, then the processes at blocks 705 to 707 are performed. At block 705, fuel is caused to be injected into the cylinder 103, provided that fuel injection has not already been caused to be performed during the current intake stroke. For example, if the controller 104 has already provided an output signal to cause injection of fuel during the current intake stroke, then further fuel is not caused to be injected at block 705.

At block 706 the intake valve 301 is caused to close and subsequently remain closed for revolutions of the engine 101 immediately following closing of the intake valve 301. The fuel in the cylinder 103 is then caused to ignite at block 707 before the process at block 708 is performed.

Alternatively, if it is determined at block 702 that the intake valve 301 is currently closed, it is determined at block 703 whether the next opening of the intake valve is already scheduled and the next opening of the intake valve will be performed, for example because it is not possible to prevent the next scheduled opening. If it is determined that the next opening is scheduled and will be performed, then the processes at blocks 705 to 707 are performed as described above. Alternatively, if it is determined that the next opening is not yet scheduled or is scheduled but may nevertheless be stopped, the process at block 704 is performed. At block 704 the intake valve of the cylinder 103 is caused to remain closed for the current revolution of the engine 101 and revolutions of the engine that immediately follow the current revolution. The process at block 708 is then performed, in which a second request signal indicative of a request to increase torque output of the engine 101 is awaited. For example, the second request signal may be a signal from the accelerator pedal sensor 108 indicating that the user has depressed the accelerator pedal 105 to request engine torque.

It may be noted that, following the processes at blocks 704 or 707, while the second request signal is awaited at block 708, the intake valve 103 is not moved from its closed position. I.e. the intake valve 103 remains closed at least until a second request is received that is indicative of a request to increase a combustion torque output of the engine 101 from zero.

Figure 8A:
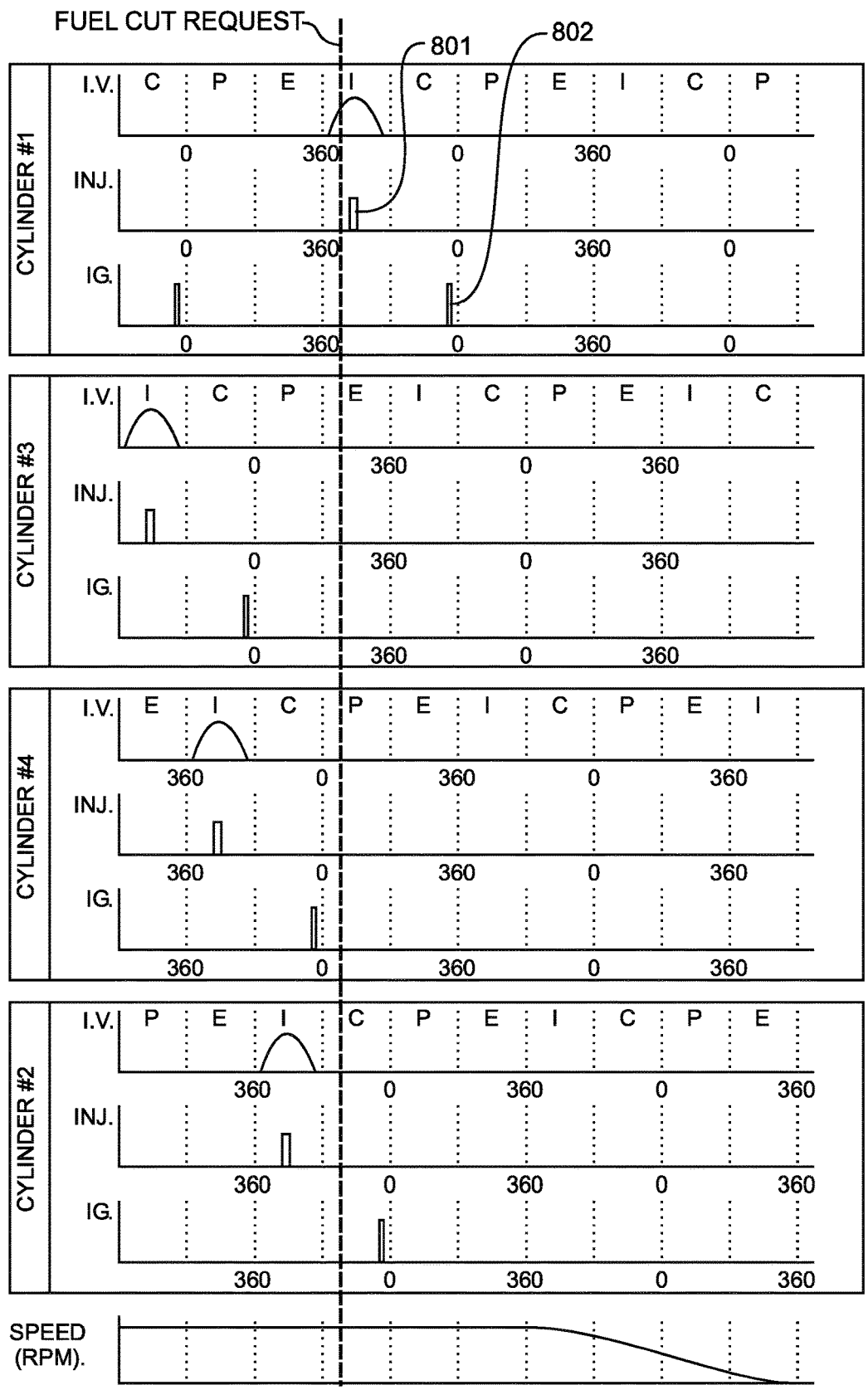
FIG. 8A shows graphs of intake valve (I.V.) position, fuel injection (INJ.) and ignition (IG.) for each of four cylinders of an engine, which illustrate control of an engine during a period in which a fuel cut request is received.

Although the methods 400 and 700 have been described above in respect of one cylinder of the internal combustion engine 101, it should be understood that the methods are also applied to all cylinders of an engine 101 having several cylinders. An example of the control of an engine 101 is illustrated in the graphs of FIG. 8A, which includes graphs of the rotational speed of the engine in revolutions per minute (RPM), intake valve (I.V.) position, fuel injection (INJ.) and ignition (IG.) for each of its four cylinders (#1, #2, #3 and #4), during a period in which a fuel cut request is received. Although not illustrated in FIG. 8A, it should be understood that the one or more exhaust valves 302 of each cylinder 103 are open for a finite period during each exhaust stroke.

Before the fuel cut request is received, the intake valve 301 of each cylinder 103 is opened and closed during intake strokes of the cylinder 103, and while the intake valve 301 of a cylinder 103 is open, fuel is injected into the respective cylinder. Towards the end of each compression stroke of each cylinder 103, the fuel in that cylinder 103 is ignited.

In the example of FIG. 8A, when the fuel cut request signal is received, the intake valve 301 of cylinder #1 is open and therefore fuel is injected 801 into the cylinder 103 and subsequently ignited 802 towards the end of the compression stroke to produce a final burn. The intake valve 301 of cylinder #1 is then kept closed for subsequent revolutions of the engine 101. The intake valve 301 of the other cylinders 103 (#2, #3 and #4) is closed at the time that the fuel cut request signal is received, and consequently the intake valves of those cylinders (#2, #3 and #4) are kept closed for the current and subsequent revolutions of the engine 101. In the case of cylinder #2, the piston 300 is currently on its compression stroke, the cylinder having just received fuel and air during its previous intake stroke. Consequently, ignition is allowed to occur during the current compression stroke of cylinder #2, so that combustion products are exhausted to the catalytic converter 209 during the subsequent exhaust stroke.

Figure 8B:
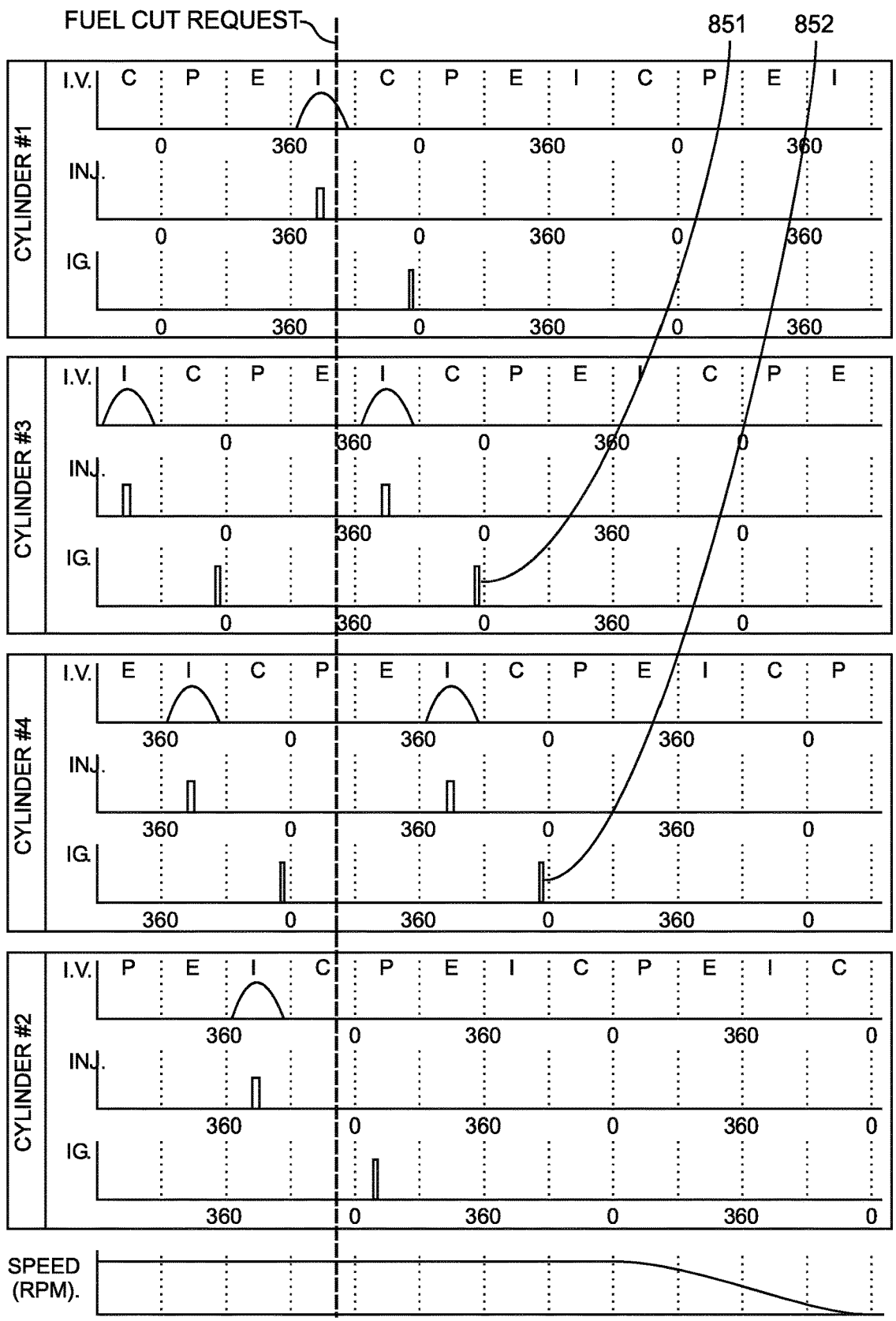
FIG. 8B shows graphs of intake valve (I.V.) position, fuel injection (INJ.) and ignition (IG.) for each of four cylinders of the engine, which illustrate control of an engine during a period in which a fuel cut request is received.

A second example of the control of an engine 101 is illustrated in the graphs of FIG. 8B, which includes graphs of the rotational speed of the engine in revolutions per minute (RPM), intake valve (I.V.) position, fuel injection (INJ.) and ignition (IG.) for each of its four cylinders 103, during a period in which a fuel cut request is received. The graphs of FIG. 8B are like those of FIG. 8A, but in this example, the fuel cut request is received towards the end of the intake stroke of cylinder #1, the exhaust stroke of cylinder #3, the power stroke of cylinder #4 and the compression stroke of cylinder #2. In this example, the next opening of intake valves of cylinder #3 and cylinder #4 have already been scheduled, and consequently those intake valves are opened after the fuel cut request signal is received. However, fuel is injected in cylinder #3 and cylinder #4 during the periods in which the respective intake valves are open, and in this example, a final ignition 851 and 852 is performed in each of those two cylinders #3 and #4, so that combustion products are exhausted to the catalytic convertor 209.

After the intake valves of the cylinders #3 and #4 are closed, they are then kept closed during subsequent revolutions of the engine, until the rotational speed of the engine is zero.

As will be described below with regard to FIGS. 7 and 11, the final ignition 852 and/or the final ignition 851 may be delayed until the respective piston 300 has reached top dead centre (shown as the angle "0" on the graphs), so that a larger proportion of combustible gases reach the catalytic converter 209. In addition, or alternatively, the final ignition 852 and/or final ignition 851 may be omitted, so that a fuel and air mixture reaches the catalytic converter 209. However, in each case, the air-fuel ratio may be maintained at lambda=1, so that a stoichiometric mixture reaches the catalytic converter.

Figure 9:
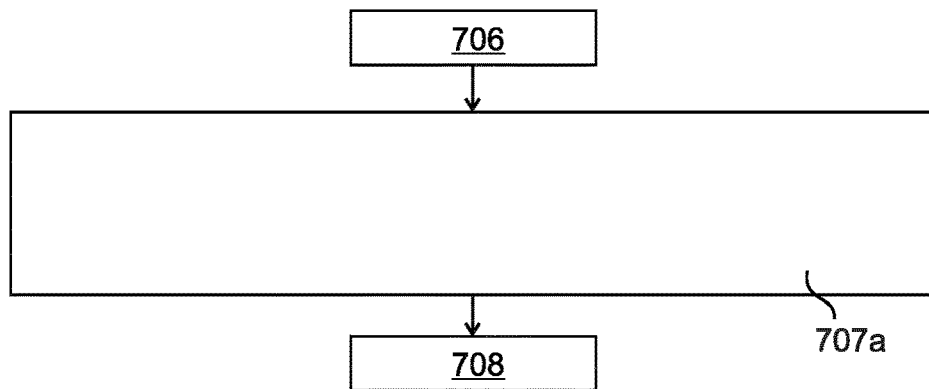
FIG. 9 shows a flowchart illustrating a process in which ignition of fuel is caused to occur, only after a piston in a cylinder has reached top dead centre.

In an example of the method 700 of FIG. 7, the process at block 707 comprises causing ignition of the fuel in the cylinder 103 following closing of the intake valve 301. In one example illustrated in FIG. 9 the process at block 707a includes causing ignition of the fuel in the cylinder following closing of the intake valve only after the piston 300 in the cylinder 103 has reached top dead centre. A flowchart illustrating this process is shown in FIG. 9, and an example of the control of an engine 101 is illustrated in FIG. 11, which include graphs of intake valve (I.V.) position, fuel injection (INJ.) and ignition (IG.) for each of its four cylinders 103, during a period in which a fuel cut request is received. It should be understood that the exhaust valve(s) 302 of each cylinder 103 are open for a finite period during each of their exhaust strokes.

Figure 11:
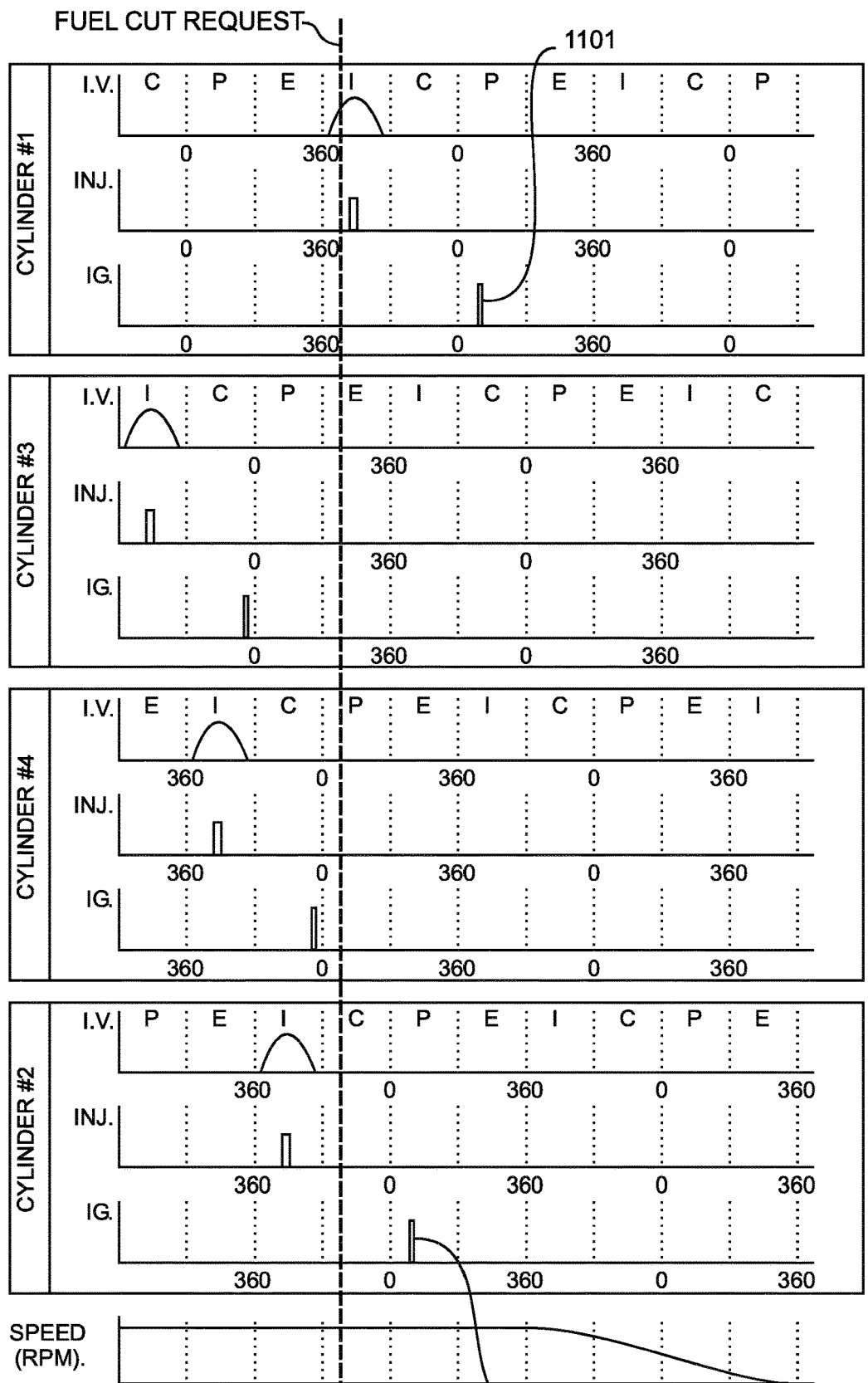
FIG. 11 shows graphs of intake valve (I.V.) position, fuel injection (INJ.) and ignition (IG.) for each of four cylinders, during a period in which a fuel cut request is received, in an example of the method of FIG. 7.

The graphs of FIG. 11 are like those of FIG. 8A, but after the receipt of the fuel cut request signal, the ignition 1101 and 1102 that takes place in cylinder #1 and cylinder #2 is delayed until after the respective piston 300 has reached top dead centre (shown as the angle "0" on the graphs). Consequently, combustion is delayed and the gases exhausted from cylinders #1 and #2 comprise a larger proportion of combustible gases than there would be if the ignitions 1101 and 1102 were performed before top dead centre was reached by the respective pistons 300. Consequently, a relatively large quantity of combustible gases is combusted in the catalytic converter 209, so that the temperature of the catalytic converter 209 is boosted. As a result, the temperature of the catalytic converter 209 remains above its operating temperature for a longer period after the engine 101 is stopped, and there is a higher probability of it being above its operating temperature when the engine is restarted.

In an alternative method, the processes are the same as those of the method 700, illustrated by the flowchart of FIG. 7 but the process at block 707 is omitted. Thus, in this alternative method fuel is injected at block 705 and during a subsequent exhaust stroke a mixture of unburnt fuel and air is exhausted to the catalytic converter 209 where it is more slowly converted into combustion products. In an example of this alternative method, fuel is caused to be injected during intake strokes of cylinder(s) 103 for which the intake valve(s) 301 are open at the time of receiving a fuel cut request signal, and subsequently those intake valve(s) 301 are caused to remain closed during revolutions of the internal combustion engine 101 immediately following the next closing of the intake valve(s), as illustrated in the example of FIG. 11. However, in the alternative method, the final ignition 1101 in cylinder #1 is not performed and the final ignition 1102 in cylinder #2 may not be performed.

Figure 10:
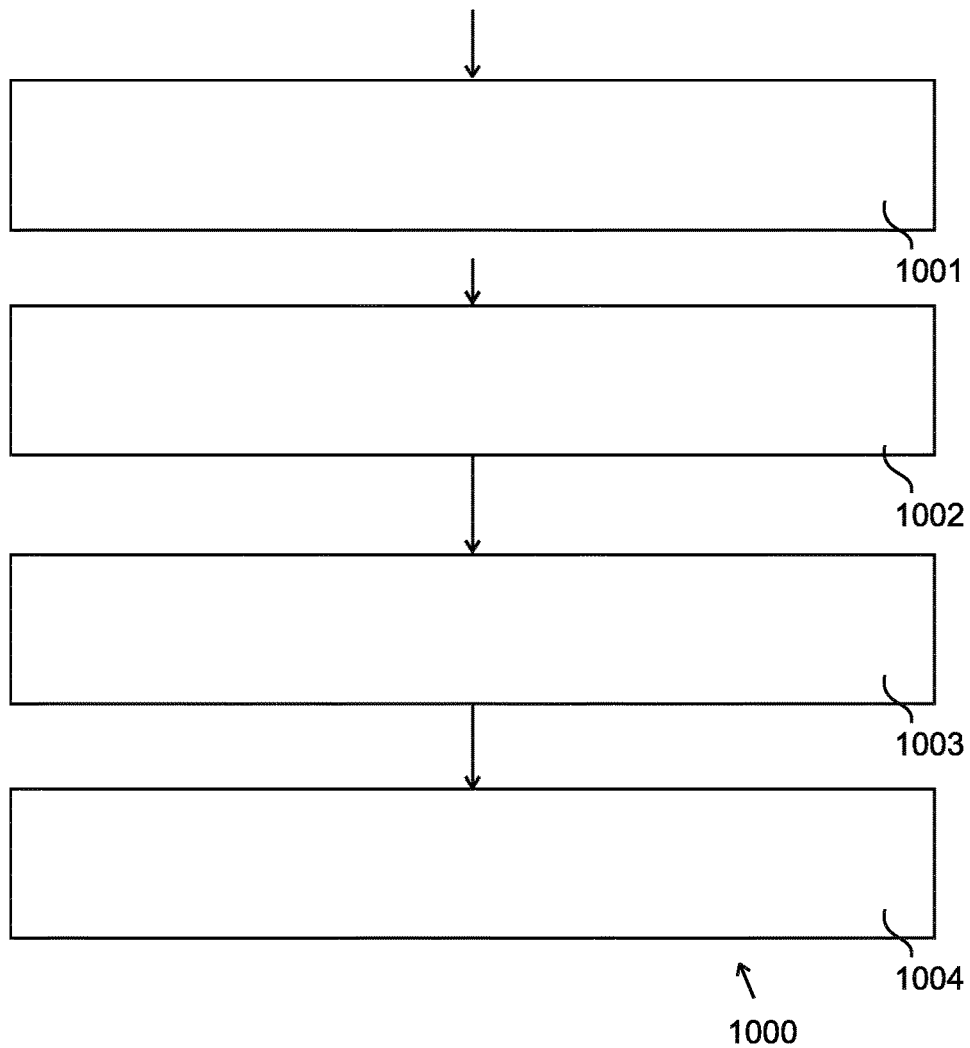
FIG. 10 shows a flowchart illustrating a further method of controlling an internal combustion engine.

A flowchart illustrating a further method 1000 of controlling an internal combustion engine 101 performable by the controller 104 is shown in FIG. 10. This method 1000 relates to increasing the combustion torque produced by the engine 101 from zero and therefore may follow on from the method 400 of FIG. 4 or the method 700 of FIG. 7 in which the combustion torque produced by the engine was reduced to zero by cutting the supplied fuel. The method 1000 of FIG. 10 may be performed when the engine speed is zero, for example, when the vehicle 100 is first started. Alternatively, the method 1000 may be performed following an eco-stop (in which fuel supply to the engine 101 was cut, for example due to the user depressing the brake pedal 107) and the engine 101 is still turning when the user depresses the accelerator pedal 105 causing the generation of a request for positive engine torque.

At block 1001 of the method 1000 a second request signal is received indicative of a request to increase torque output from the internal combustion engine 101 from zero. At block 1002 of the method 1000, opening of the intake valves 301 of each cylinder 103 of the engine 101 is caused to be scheduled. The scheduling of opening of the intake valves 301 may be dependent on the current speed of the engine 101 and dependent on the position of each of the respective cylinders 103 within their four-stroke cycles. The position of each of the cylinders 103 may be determined from the signals received from the position sensing device 203 (shown in FIG. 2) described above.

At block 1003, injection of fuel is caused to be scheduled for each cylinder 103 for which the intake valve 301 is scheduled to be opened during its next intake stroke. In the present embodiment, the quantities of fuel scheduled to be injected provide a stoichiometric mixture of fuel and air in the cylinders 103. This is possible because, as described above, the catalytic converter 209 was not oxidized during revolutions of the engine 101 following the fuel cut to the engine 101, and therefore a rich mixture is not required in order to reduce oxidized components of the catalyst when the engine 101 is restarted.

At block 1004 of the method 1000, fuel is caused to be combusted during each power stroke that next follows each intake stroke during which the corresponding intake valve 301 was open. For each of the cylinders 103, if an intake valve 301 is opened during start-up of the engine 101, fuel is also injected and combustion is caused to take place during the next following power stroke. As previously described, during shut down of the engine 101, the last time an intake valve 301 of each cylinder 103 is opened, fuel is injected and no further opening of the intake valve 301 is allowed while the combustion torque of the engine 101 is reduced to zero. Thus, for a cylinder 103 that starts with a power stroke at engine start-up, no combustion may be possible during that first power stroke. However, it may be noted that for that cylinder 103 the intake valve 301 was not open during its most recent intake stroke, having been kept closed since the final power stroke during engine shut-down.

Figure 12:
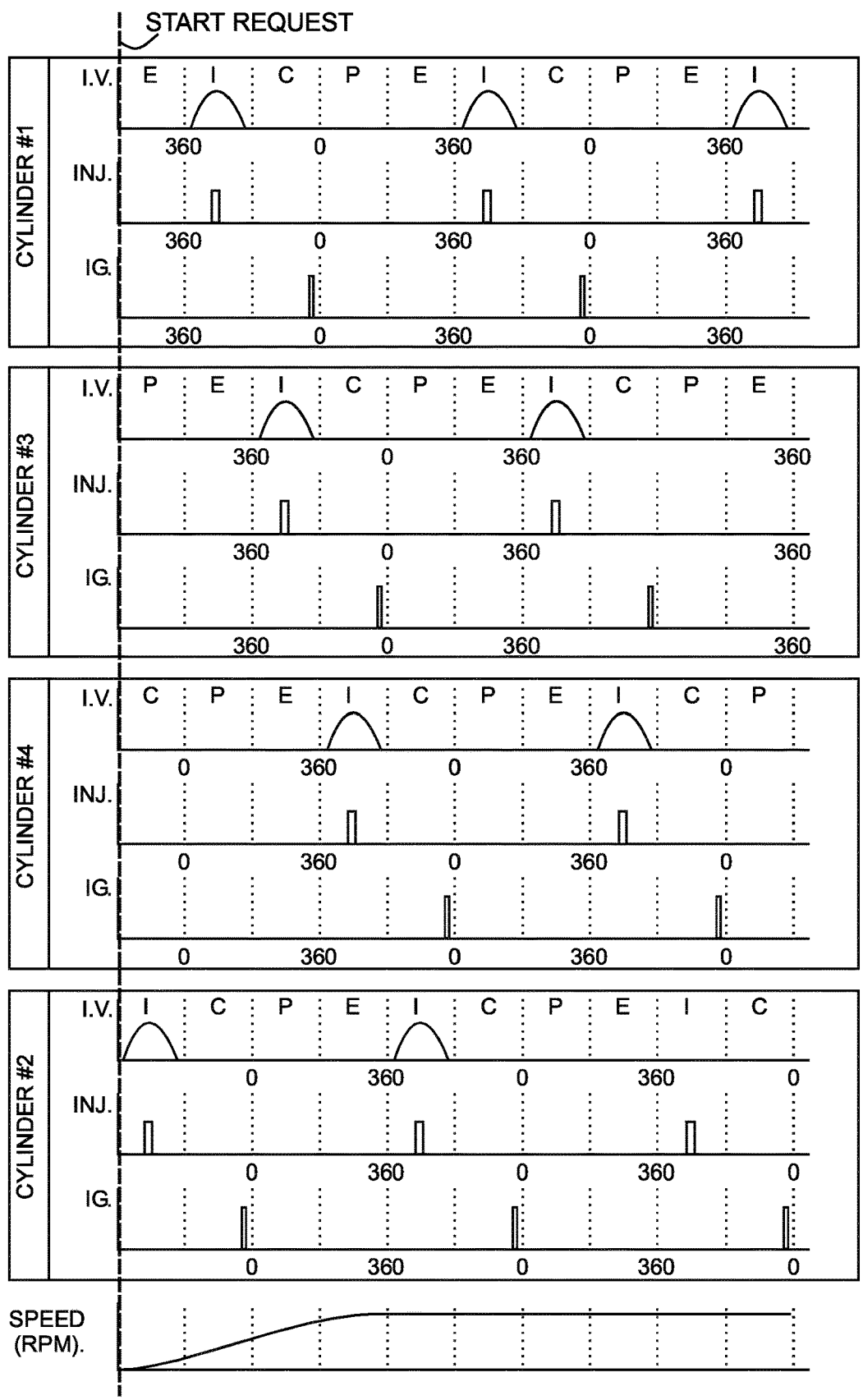
FIG. 12 shows graphs of intake valve position, fuel injection, ignition and engine speed during revolutions of the engine just after a start request signal indicative of a request for positive engine torque is received.

An example of the method 1000 is illustrated by the graphs of FIG. 12, which show intake valve position, fuel injection, ignition and engine speed during revolutions of the engine 101 just after a start request signal indicative of a request for positive engine torque is received by the controller 104. It should be understood that the exhaust valve(s) 302 of each cylinder 103 are open for a finite period during each exhaust stroke.

In the example of FIG. 12, the engine 101 is initially at rest (i.e. its speed of rotation is zero). On receipt of the start request signal, the controller 104 immediately schedules opening of the intake valves 301 and fuel injection (to occur during intake strokes of each cylinder 103) and schedules ignition to occur towards the end of the following compression strokes. It may be noted that there is no additional injection of fuel and no ignition during the first compression stroke of cylinder #4. Due to the method 400 or method 700 described above, the cylinders 103 contain combustion products when the start request signal is received rather than air (which they would contain if the intake valves 301 were not held closed after the final combustions), and therefore an additional injection of fuel during the first compression stroke of cylinder #4 is not required.

Figure 13:
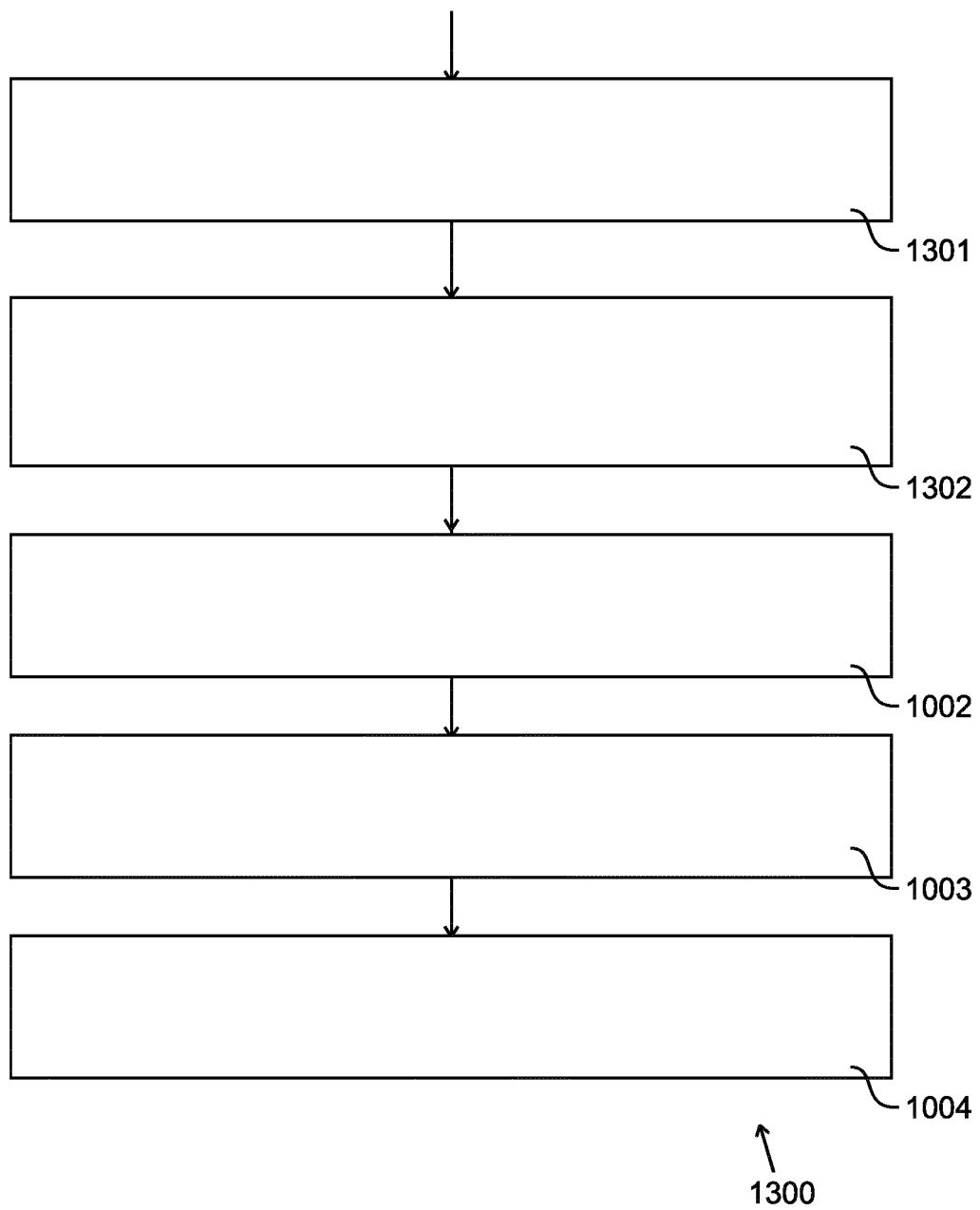
FIG. 13 shows a flowchart illustrating another method of controlling an internal combustion engine.

A flowchart illustrating a method 1300 of controlling an internal combustion engine 101 is shown in FIG. 13, which provides an example of the method 1000 of FIG. 10. At block 1301 of the method 1300, a start request signal is received indicative of a request to increase speed of the internal combustion engine from zero. At block 1302 an intake valve 301 of at least one cylinder 103 of the engine 101 is maintained in a closed position during at least a first intake stroke of the at least one cylinder 103. This results in a smooth start-up of the engine without oxidation of the catalytic converter, as described below with reference to FIG. 14.

The remainder of the method 1300, illustrated in FIG. 13, further comprises the processes at blocks 1002, 1003 and 1004 as described above in respect of FIG. 10. Thus, after the intake valve 301 of at least one cylinder 103 is kept closed at block 1302, the intake valves 301 are opened in accordance with scheduling performed at block 1002, fuel is caused to be injected into each cylinder at block 1003, and at block 1004 fuel is caused to combust during each power stroke of a cylinder that next follows each intake stroke in which the intake valve was open.

Figure 14:
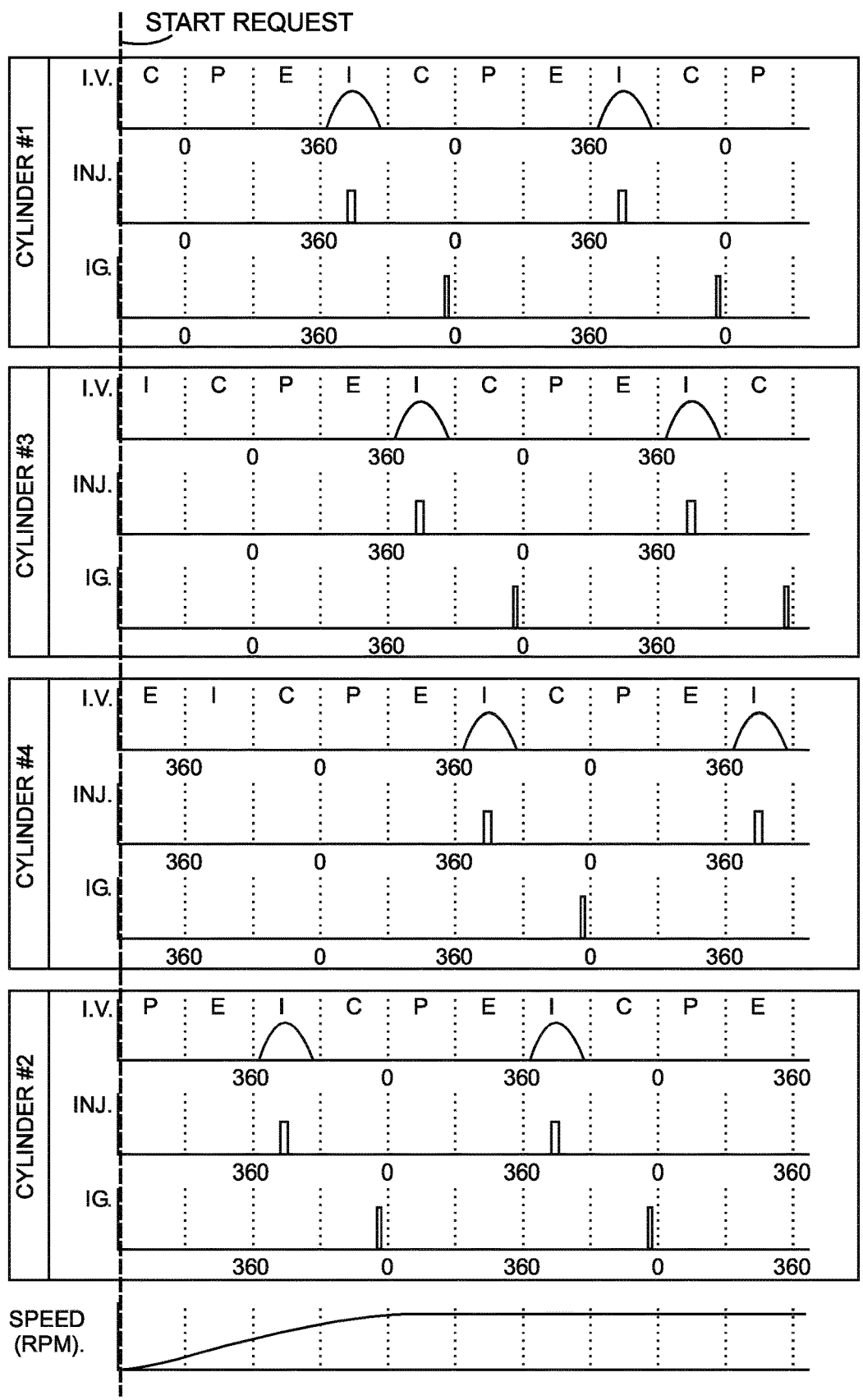
FIG. 14 shows graphs of engine speed as it increases from zero, along with intake valve (I.V.) position, fuel injection (INJ.) timing, and ignition (IG.) timing for the four cylinders of the engine during its first revolutions after receipt of a start request signal.

An example of the method 1300 is illustrated by the graphs of FIG. 14, which show engine speed as it increases from zero, along with intake valve (I.V) position, fuel injection (INJ.) timing, and ignition (IG.) timing for the four cylinders 103 of the engine 101 during its first revolutions after receipt of a start request signal. Initially, the engine 101 is rotated by the secondary torque source 102. The rate at which the speed of the output of the engine increases from zero up to idle speed (e.g. 700 revolutions per minute) under the action of the secondary torque source 102 is known, for example from prior measurements, and therefore the angle through which the engine 101 must be rotated before a first ignition is required is also known. If the secondary torque source 102 is a belt integrated starter generator then the engine speed may reach the idle speed before valve motion is enabled. If the secondary torque source 102 is a traditional 'pinion starter' then the engine speed may be significantly lower than idle speed (e.g. 300 revolutions per minute) when valve motion is enabled. In any case the valve motion may be inhibited during the engine speed increase and commence operation 1 revolution prior to intended combustion.

In the present example, the first power stroke is required to occur when the engine 101 has approximately reached its idle speed, and therefore the first ignition is required after the engine has turned through about 720 degrees. In this instance the cylinder that has its first power stroke when this speed has been achieved is cylinder #2. In preparation to cause combustion during this power stroke of cylinder #2, its intake valve 103 is the first to be opened after about 360 degrees and fuel is injected.

As shown in FIG. 14, by the time that the first intake valve 103 is opened, the engine 101 has already reached a speed of more than about 50% of idle speed.

In this example, during starting by the secondary torque source 102, the first cylinders to perform intake strokes are cylinders #3 and #4, but it may be predicted that the engine 101 will not be rotating sufficiently quickly at the time of their first power strokes. Therefore, during the first intake stroke of cylinder #3 and cylinder #4, the intake valves 301 of those cylinders are maintained in a closed position and no fuel is injected. Consequently, there is no combustion during the first power strokes of cylinder #3 and cylinder #4.

By preventing combustion during the first power strokes of the cylinders #3 and #4 in the example of FIG. 14, the engine 101 may be accelerated from zero speed in a smooth manner by a secondary torque source, and therefore noise vibration and harshness may be minimised. Also, because the intake valve(s) of cylinders #3 and #4 are kept closed during the first intake stroke, air is prevented from being drawn into those cylinders and exhausted to the catalytic converter in the next exhaust stroke. Consequently, unwanted oxidation of the catalytic converter is prevented.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in the FIGS. 4, 7, 9, 10 and 13 may represent steps in a method and/or sections of code in the computer program 211. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A controller for controlling operation of an internal combustion engine comprising a plurality of cylinders, the controller being configured to:
   receive a request signal indicative of a request to increase the speed of the internal combustion engine from zero;
   in dependence on receiving the request signal, provide an output signal to cause the internal combustion engine to be rotated; and
   maintain in a closed position an intake valve of at least one cylinder of the internal combustion engine during at least a first intake stroke of the at least one cylinder.

2. The controller according to claim 1, wherein the controller is configured to cause combustion of fuel during each power stroke that immediately follows an intake stroke in which the intake valve is open.

3. The controller according to claim 1, wherein the controller is configured to:
   receive a second request signal indicative of a request to increase a combustion torque output of the internal combustion engine from zero;
   cause opening of the intake valve of each cylinder of the internal combustion engine;
   cause injection of fuel into each said cylinder; and
   cause combustion of fuel during each power stroke of each said cylinder that next follows each intake stroke of that cylinder in which the intake valve was open.

4. The controller according to claim 1, wherein the controller is configured to cause a secondary torque source to rotate the internal combustion engine while the intake valve of the at least one cylinder is maintained in the closed position.

5. The controller according to claim 1, wherein the controller is configured to prevent opening of any intake valve of the internal combustion engine until: an intake stroke of a cylinder of the internal combustion engine that is expected to have its next power stroke after the internal combustion engine has reached a required speed of rotation; or the internal combustion engine has been rotated through a predefined angle.

6. The controller according to claim 1, wherein the controller is configured to cause a first opening of the intake valve of the at least one cylinder following receipt of a second request signal or the request signal, and cause injection of fuel into the at least one cylinder for combustion during a first combustion stroke following the first opening.

7. The controller according to claim 6, wherein the injection of fuel into the at least one cylinder for combustion during the first combustion stroke following the first opening produces a stoichiometric mixture of air and fuel.

8. An internal combustion engine comprising the controller of claim 1, wherein the engine comprises one or more exhaust valves mechanically actuated by cams fixed to a camshaft.

9. The internal combustion engine according to claim 8, wherein the internal combustion engine is arranged to inject fuel directly into the cylinder.

10. A vehicle comprising the internal combustion engine according to claim 9.

11. A control system for controlling operation of an internal combustion engine comprising a controller according to claim 1 and a valve actuation means configured to cause opening of the intake valve of each cylinder of the internal combustion engine in dependence on a received signal and allow the intake valve of each said cylinder to remain closed during an intake stroke of each said cylinder.

12. The control system according to claim 11, wherein the valve actuation means comprises a variable valve lift system.

13. The control system according to claim 12, wherein the variable valve lift system comprises a continuous variable valve lift system.

14. The control system according to claim 11, wherein the variable valve lift system comprises a hydraulic system.

15. A method of controlling an internal combustion engine, the method comprising:
   receiving a request signal indicative of a request to increase the speed of the internal combustion engine from zero;
   in dependence on receiving the request signal, providing an output signal to cause the internal combustion engine to be rotated; and
   maintaining in a closed position an intake valve of at least one cylinder of the internal combustion engine during at least a first intake stroke of the at least one cylinder.

16. A non-transitory computer readable storage medium comprising computer readable instructions that, when executed by a processor, cause the processor to perform the method according to claim 15.

* * * * *